UNITED STATES PATENT OFFICE.

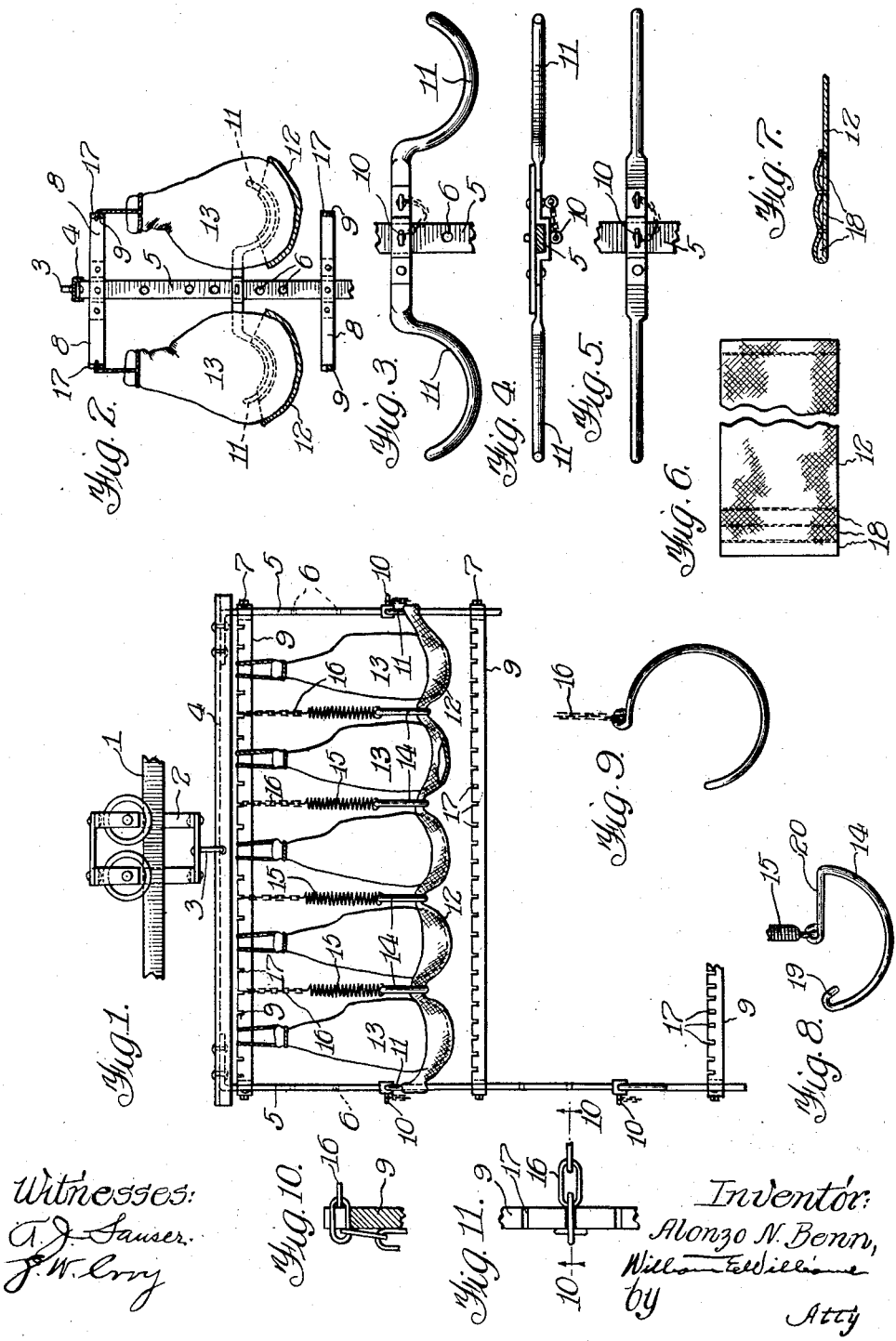

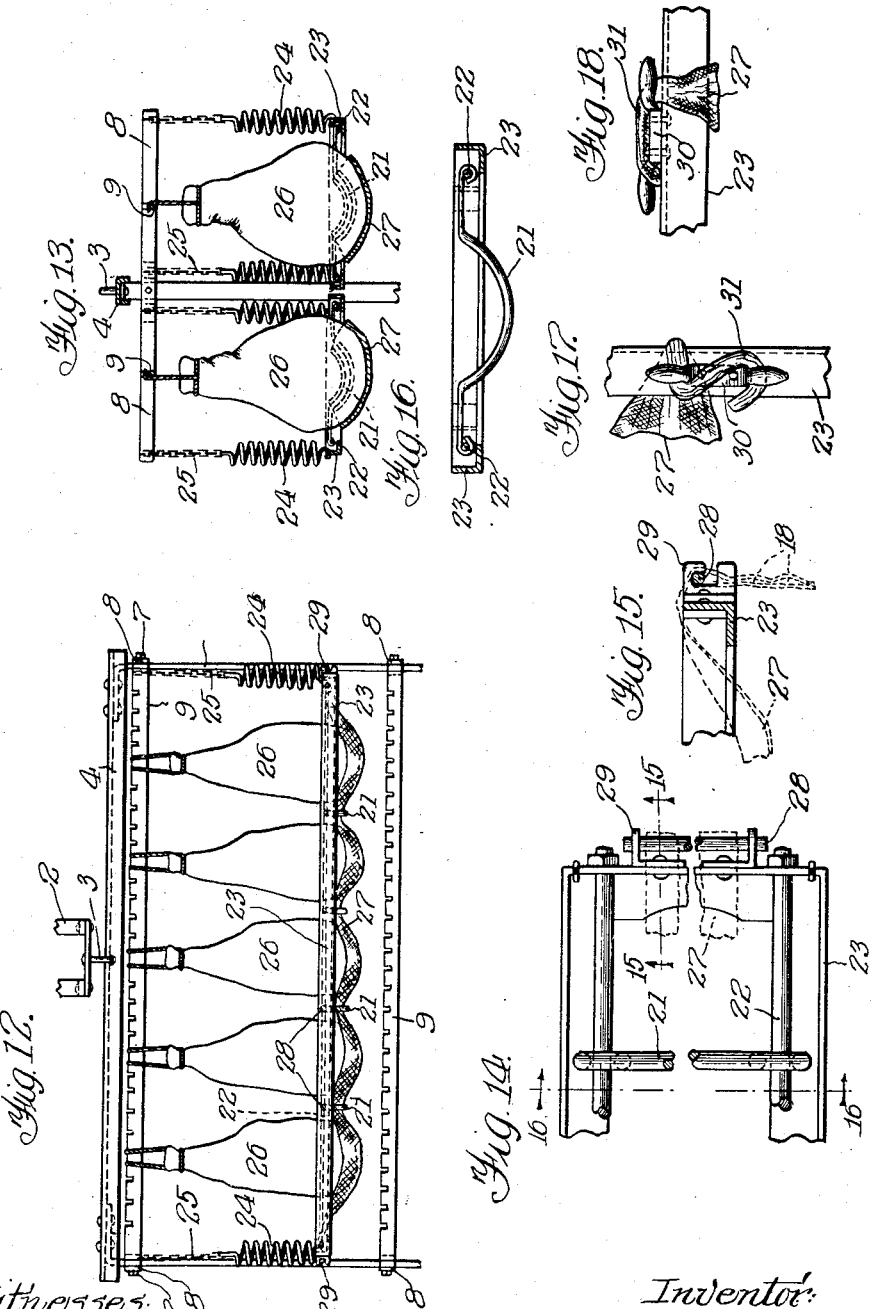

ALONZO NEWTON BENN, OF CHICAGO, ILLINOIS.

MEAT-SMOKING TROLLEY.

1,226,845.  Specification of Letters Patent.  Patented May 22, 1917.

Application filed October 16, 1916. Serial No. 125,967.

*To all whom it may concern:*

Be it known that I, ALONZO N. BENN, a citizen of the United States, and a resident of Chicago, county of Cook, and State of Illinois, have invented a new and useful Improvement in Meat-Smoking Trolleys, of which the following is a specification.

In smoking meats the present custom in the larger packing houses is to hang the meat on a metal frame-work, which is supported by a small wheeled-carriage riding on an over-head rail and the smoking-room may be likened unto a switch-yard of railroad tracks, the tracks being represented by a system of trolley rails hung from the ceiling. In this system the meat is hung on the frame-work outside of the smoking-room and the whole frame-work loaded with meat and supported on the trolley rail is run into the smoking-room and retained there until the smoking and drying process is completed and then the trolleys are run out again for the discharge of their load and reloading. Thus the meat-supporting devices have obtained the name of trolleys in the modern practice. However before the advent of supporting meat on trolleys on rails, various supporting means were used for supporting meat in the smoking-rooms.

My invention relates to the hanging, supporting and protecting means for the individual pieces of meat and may be used with various meat supporting devices irrespective of the use of trolleys and over-head tracks or other means of handling meats in a general way.

The object of my invention is to provide hanging, supporting and protecting means that will act on the meat during the treating, smoking and drying process in such a way as to improve the quality of the meat and lessen losses that have heretofore taken place with the other means in use and the invention is set forth in the claims.

Various different classes of meat are treated, smoked and dried during the period in which the meat is hung up and some kinds of meat suffer more or less serious distortions and injuries when hung during the treating, smoking and drying process. For illustration meat known as picnic hams or picnics, which are cut from the shoulder section of animals, have a less periphery covered and bound together by the skin surface than regular hams and when these meats are hung up as is ordinarily the case, the lean fleshy portions on the inside dry up and contract much more than the fatty skin-covered outside, thus making a more or less abrupt difference in the length at the butt of the picnic ham between the fatty and lean portions, where no such variation exists in the freshly cut and trimmed pieces. Thus the protruding fatty end or butt is a source of loss and a detriment to the quality and sale of the meat. Similar and other injuries occur to all classes of meats when hung for the treating, smoking and drying process as has been the practice heretofore. Furthermore in cutting meats generally the aim is to make uniform and regular surfaces and avoid what might be termed "capes and peninsulas" or irregular protrusions and projections which burn, dry up, shrink and crack and become more or less injured in the treating, smoking and drying, which injuries I aim to prevent in my hanging, supporting and protecting means.

In spite of the care that is used to make uniform cuts of meats when the same are fresh, different fibers are under different tension and when cut free, different portions will draw into different relationship from that which they held before the cutting and trimming, often requiring extra trimming which otherwise would be unnecessary in order to produce the desired symmetry of form and I aim with my devices to counterbalance this feature. Further when meat is hung up the action of gravity produces distortions and projections and also brings about the injuries above described and I aim with my invention to prevent these injuries.

Reference will be had to the accompanying drawings in which:

Figure 1 is a side elevation of the preferred form of my meat smoking trolley.

Fig. 2 is an end elevation.

Fig. 3 is an end elevation of the end cloth-holder hooks for holding the protecting cloths shown in Figs. 1 and 2.

Fig. 4 is a plan of Fig. 3.

Fig. 5 is a modified form of Figs. 3 and 4.

Fig. 6 is an enlarged detail in plan of the protecting cloth.

Fig. 7 is an edge view of the left end of Fig. 6.

Fig. 8 is a side view of one of the intermediate spring adjuster hooks.

Fig. 9 is a modified form of Fig. 8.

Figs. 10 and 11 are details of the means for fastening the chains that support the spring adjuster hooks.

Fig. 12 is a modified form of the general device and shows a side elevation.

Fig. 13 is a transverse sectional elevation of Fig. 12.

Fig. 14 is a plan detail of the protecting cloth supporting frame shown in Figs. 12 and 13.

Fig. 15 is a sectional view of Fig. 14 on line 15—15 of Fig. 14.

Fig. 16 is a transverse section of Fig. 14 on line 16—16 of Fig. 14.

Figs. 17 and 18 show a modified form for fastening the protecting cloth from that shown in Figs. 14 and 15, while Fig. 17 is a plan and Fig. 18 is an end elevation.

Smoke-house trolleys as generally constructed are simply framework of various kinds on which the meat is hung by various means, but the modern practice is to fasten string or cords in various ways to the ends of the meat and secure the cords to bars of frame-work and in this respect my trolley does not differ from the others now in use.

In the drawing 1 indicates the ordinary trolley rail and 2 the trolley carriage and 3 the supporting hook which connects the meat supporting frame-work to the trolley carriage, which is common to trolleys in general.

I prefer to construct the trolley framework with a main cross-beam 4 supported on the hook 3 as before described. At the ends of beam 4 there are vertical bars 5 in which are holes or perforations 6.

Secured in the holes 6 of the bar 5 by bolts 7 are frames composed of cross-members 8 and longitudinal members 9 and on to the latter the meat is hung in the ordinary manner as before described.

A single trolley frame may have several of these meat supporting frames 9 as is indicated in Fig. 1, thus giving the trolley capacity to carry several tiers of meat as may be desired.

Secured to bars 5 by means of the pins 10 passing through holes 6 I provide the end cloth-holder hooks 11 which carry the ends of the protecting cloth 12 which extends along under the butts of the meat here indicated as hams 13.

In between the hams 13 I provide supporting hooks 14 connected by springs 15 to chains 16 adjustably connected to the bars 9 by means of notches 17 in the bars 9 designed to permit of the adjustment of the length of the chain link by link in its length in its fastening to the bars 9.

The protecting cloth 12 is looped over at its ends in order to pass over and thereby be secured to the end cloth-holder hooks 11. At the left end of the protecting cloth I provide, by stitching down the over-lapped end, several pockets 18 which admit of an adjustment of the length of the cloth from end cloth-holder hook to end cloth-holder hook to accommodate for such shrinkage as may take place as a result of frequent washing.

In the use of the device the meats are hung up on the frame-work as ordinarily practised and then I stretch my protecting cloth underneath the butts of the meat and secure it to the end cloth-holder hooks as described. Then I engage the intermediate hooks 14 on the protecting cloth, making the adjustment of the chains such as to produce the desired spring tension on the protecting cloth, bringing the protecting cloth up snugly under and around the butts of the meat, producing as much deformation of the meat in restoring or retaining the desirable form thereof as can be done in this way without taking the load entirely off of the hanging string or cords. The chain adjustments and the adjustments of the pins 10 in the holes 6 for the end cloth-holder hooks permit me to apply my protecting cloth 12 as desired to properly shape the butts of the meat and to protect it in the treating, smoking and drying processes.

In the use of the supporting hook 14, the bent over end 19 is to assist in guarding the end of the supporting hook from digging into the meshes of the protecting cloth when the latter is being put into place. The horizontal portion 20 of the hook 14 is of assistance in holding the protecting cloth in place when the latter is being put in the embrace of the supporting hook and likewise allows a longer space for spring and chain connection than is the case with the form of supporting hook shown in Fig. 9 but even so Fig. 9 is a serviceable supporting hook.

In place of my hook, spring and chain adjustment as described, other means may be used for drawing the protecting cloth taut up between the butts of the meat, such as string or cord tied in place, etc., but I prefer to use the means I have shown in the drawings.

In the treating, smoking and drying processes, particularly in the smoking and drying, the heat comes mostly from below and hence the direct radiation is most excessive or intense on the fleshy ends of the butts of the meat; thus in using the old or present type of trolleys, portions of the butts of the meat become damaged by burning, cracking, excessive drying and excessive shrinkage of the different portions of the meat. These and other defects are prevented or remedied and the meat molded into the most desirable form when it is handled and supported in accordance with my invention.

The general flavor and condition of the body of the meat throughout is improved by the use of my invention, owing to the fact that the smoking and drying operation is made to act more uniformly from all sides of the meat, as my protecting cloth to a large extent covers the fleshy portions in a similar manner to what the skin does on the skin covered portions and but little if any of the skin covered portion is covered by my protecting cloth, which is not the case when stockinets are used in covering meats during the smoking thereof.

In Figs. 12, 13, 14, 15, 16, 17 and 18 I secure substantially the same results as described according to the previous figures but do it with a slightly modified apparatus.

In place of the individual supporting hooks 14 in Figs. 12 to 18 inclusive, I use curved cross-bars 21 secured in sliding relation on rods 22, supported in a frame 23 and the frame 23 is supported *in toto* by springs 24 and chains 25 to the cross-bars 8 of the frame 8—9 the same as in Fig. 1 only the end bars 8 of the frame extend beyond the longitudinal bars 9 as is indicated by Fig. 13. In this modified form of Figs. 12 and 13 the meat is indicated as 26 and the protecting cloth as 27 and the desired uniform supporting pressure of the protecting cloth on the meat is secured by the adjustment of the protecting cloth between the pieces of meat themselves and the spring tension is given by the adjustment of the springs for the total load on the entire cloth as a distinction from the adjustment between each piece of meat brought about as shown in Fig. 1.

In Figs. 14 and 15 the protecting cloth 27 is shown in dotted lines and it is secured at the ends by the rods 28 passing through loops in the ends of the protecting cloth as before described, the rods 28 being held in notched brackets 29 on the frame 23.

In place of fastening the protecting cloth at its ends by the loops as described, I may secure it by various different means and one of these is shown in Figs. 17 and 18, wherein a double-ended block 30 is secured to the end of the frame 23 and the end 31 of the protecting cloth is laced around the block in a manner similar to a fastening commonly used for cords and ropes.

My protecting cloth not only protects and shapes the ends of the meat but it catches and retains the grease or moisture which the heat brings to the surface of the meat and thereby prevents the same from falling in drops on the meat hanging below and materially injuring the appearance thereof by discoloration and otherwise.

Various modifications of my invention will suggest themselves in view of the great general merits thereof and within the field of the invention itself as will be readily understood.

What I claim is:

1. In a device of the class described, in combination with the ordinary means for hanging meats from the shanks thereof, a cloth extending under the butts of the meat and held in engagement therewith in a manner to protect the butts and partially mold them to desired shape.

2. In combination with the ordinary means for hanging meats from the shanks, a cloth extending under the butts of the meat and held in contact therewith by elastic means.

3. In a device of the class described, means for hanging meats from their shanks; with protecting and shaping means extending underneath the butts and supporting a part of the weight of the meat.

4. In a device of the class described, means for hanging meats by suspension in combination with supporting and protecting means extending under the bottoms of the meat and bearing part of the weight of the meat.

5. In a device of the class described, means for hanging meats by suspension in combination with supporting means at the bottom of the pieces and said supporting means composed of a cloth or yielding contact member adapted to be flexed underneath the butts of the meat.

6. In a device of the class described, supporting means for the tops of the meat in combination with supporting means extending underneath the bottoms of the meat, the latter so shaped as to protect and mold the shape of the ends of the meat during the smoking and drying.

7. In a device of the class described, means for supporting meats at the bottom ends during the smoking and drying, which means protect the bottom ends of the meat and at the same time mold it to desired form.

8. In a device of the class described, a frame work adapted to carry meats supported as individual pieces and with a cloth held under the bottom ends in elastic tension with the meat and shaped as held in a manner to round up the bottom ends of the pieces of meat.

9. In a device of the class described, a frame-work provided with supporting rails to which the top ends of the pieces of meat are secured; with a cloth mounted in the frame-work and adapted to extend under the bottom ends of the meat and with means for adjusting the tension of the cloth in contact with the meat.

10. In a device of the class described, a frame-work adapted to support a plurality of meat pieces from their upper ends and to support a cloth extending under the bottom ends of the meat; with adjustable elastic tension devices engaging the cloth at intervals between the meat pieces in a manner that the cloth be made to assist in supporting all the meat pieces and shape the ends thereof during the smoking and drying.

11. In a device of the class described, a frame-work having main rails for supporting the meat pieces and cross-bars adjustable in relation to the rails for holding the ends of a supporting cloth adapted to extend under the bottom ends of pieces of meat and assist in supporting same and protect the ends during the smoking and drying.

12. In a device of the class described, a frame-work having longitudinal bars adapted to support meats as individual pieces, a cloth adapted to extend under the bottom ends of the meat and means for adjusting the tension of the cloth, which means is composed of hooks embracing the cloth and provided with adjustable spring connections to the main supporting rail.

13. In a device of the class described, a cloth adapted to extend under the bottom of the meat pieces and assist in supporting the same and at the same time protecting and shaping the ends of the meat and said cloths adjustably connected in the device.

14. In a device of the class described, a cloth adapted to extend under the bottom ends of the pieces of meat and assist in supporting the same; with hooks adapted to engage the cloth at the ends thereof and also at intervals between the pieces of meat.

15. In a device of the class described, supporting means for the pieces of meat; a cloth adapted to cover the bottom ends of the pieces of meat and adjustable means for holding the cloth in contact with the meat.

16. In a device of the class described, a main frame for supporting the meat pieces with adjustable devices on the frame adapted to hold a cloth underneath the lower ends of the meat in elastic relationship to the meat ends.

17. In a device of the class described, a cloth adapted to be held under the bottom ends of the pieces of meat; with curved hooks adapted to engage the cloth and hold it in proper shape in contact with the meat.

18. In a device of the class described, a main frame supporting the meat, hooks connected by means of chain-links in adjustable relation to the main frame, a cloth adapted to be embraced by the hooks and held in engagement to the bottom ends of the pieces of meat through the medium of the hooks.

19. In a device of the class described, a main frame-work to which the meat is secured, a cloth extending under the lower ends of the pieces of meat, means for supporting the cloth in position connected by chain-links and the latter connected adjustably by means of notches in the bars of the main frame into which the links of the chain are adapted to register.

20. In a device of the class described, a frame-work having horizontal bars to which the meat is secured, cross-bars on the frame-work adjustable in vertical relation to the meat supporting bars, a cloth adjustably connected to the cross bars and extending under the lower ends of the pieces of meat.

21. In a device of the class described, a frame-work provided with horizontal bars to which the meat is attached, a cloth extending under the lower ends of the meat and supported in elastic contact therewith in a manner to exert lifting pressure on the meat, hooks for supporting the cloth and coil-spring means for supporting the hooks.

Signed in Chicago, in the State of Illinois and the county of Cook this 14th day of October, 1916.

ALONZO NEWTON BENN.

Witnesses:
A. J. SAUSER,
S. W. CROY.

Copies of this patent may be obtained for five cents each, by addressing the "Commissioner of Patents, Washington, D. C."